Dec. 29, 1970   F. J. SALGO   3,551,051
INFRA-RED DETECTORS
Filed Aug. 18, 1967   3 Sheets-Sheet 1

Francis J. Salgo
INVENTOR.

BY Murray Robinson

ATTORNEY

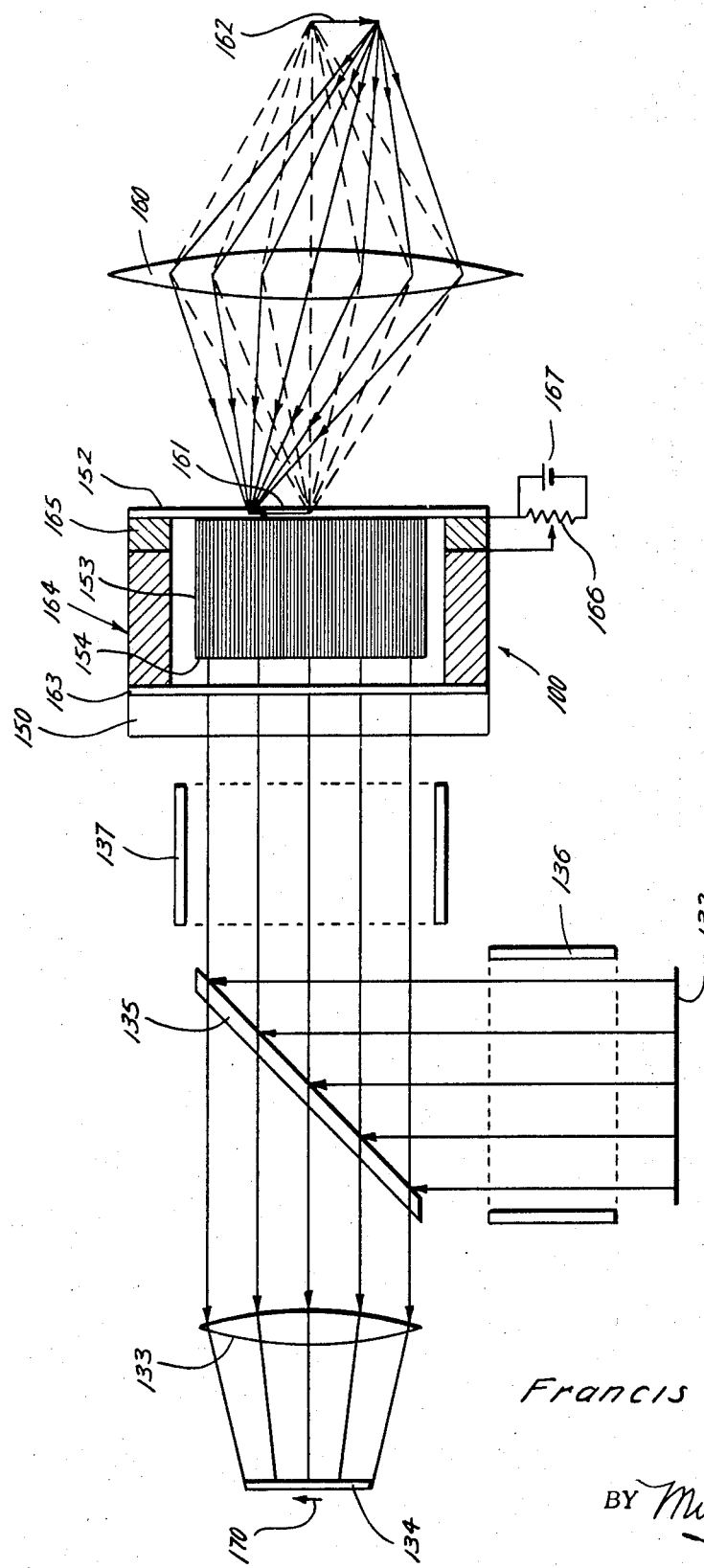

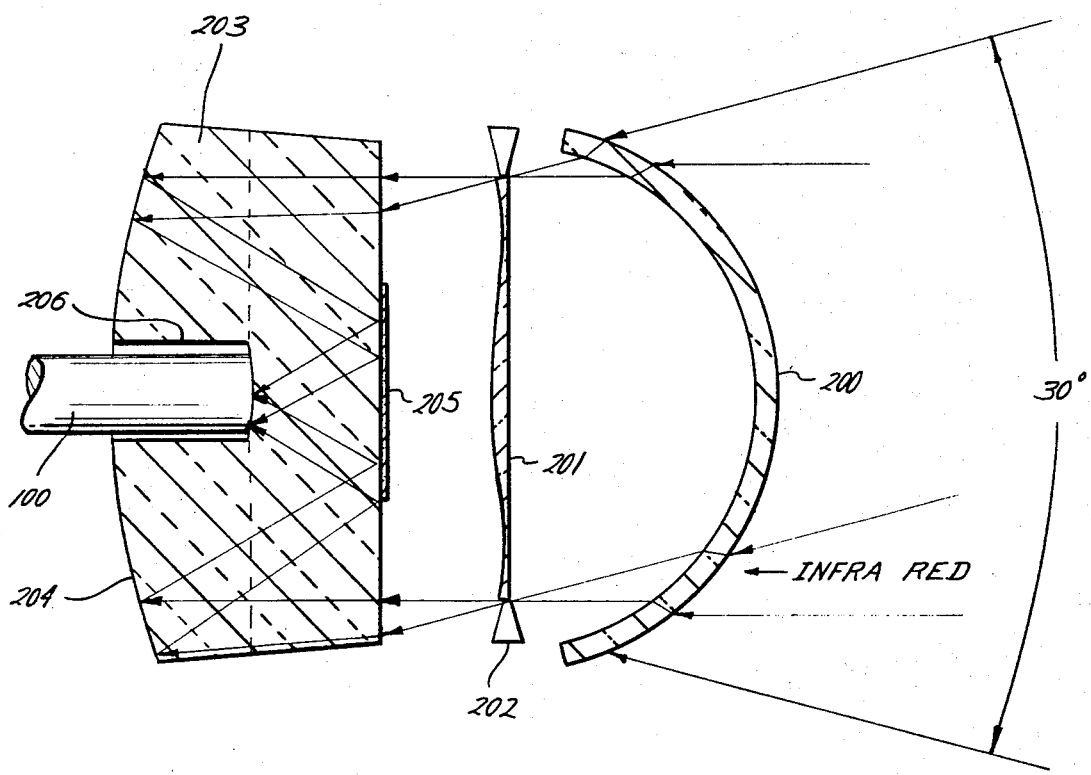

3,551,051
INFRA-RED DETECTORS
Francis J. Salgo, Garland, Tex., assignor to General Electrodynamics Corporation, Garland, Tex., a corporation of Texas
Filed Aug. 18, 1967, Ser. No. 661,635
Int. Cl. G01n *21/34;* G01b *9/02*
U.S. Cl. 356—51                                                10 Claims

ABSTRACT OF THE DISCLOSURE

A Fabray-Perot interferometer, or etalon, may be modified by providing a semi-transparent mirror to reflect the incident radiation onto the front plate of the etalon, making the backplate mirror of the etalon totally reflecting, and viewing the radiation leaving the etalon from the front through the semi-transparent mirror.

Incident radiation is a parallel, preferably monochromatic beam. Etalon spacing is adjusted to normally produce reinforcement of the beam reflected from the front plate by that reflected from the back plate. The body supporting the back plate mirror surface also serves as a receiver for infra-red radiation to be detected. The body expands on absorption of supra ambient infra-red to vary the etalon spacing. This causes beam interference indicating presence of the infra-red. By using a composite back plate comprising a bundle of fibers of infra-red transmitting and absorbing material of substantial temperature coefficient of expansion, each fiber having a diameter of the order of 10 to 20 microns and each with one end affixed to a base and the other end ground to a mirror finish, the radiation from the etalon will produce a sharp visible image corresponding to that of the infra-red focused on the infra-red transmitting base.

FIELD OF THE INVENTION

This invention pertains to infra-red radiation detectors. Primarily it pertains to infra-red image conversion but it may also be used for a point detector.

An object of the invention is to provide a mechanical (non-electronic) infra-red image converter.

Another object of the invention is to provide an infra-red image converter that will be portable, light in weight, and rugged.

A further object of the invention is to provide an infra-red image converter which will produce an image of any desired brightness.

Another object of the invention is to provide an infra-red converter which will have a small time constant high resolution, and low distortion.

Yet another object of the invention is to provide an infra-red image converter which will respond to a very long wavelength infra-red radiation without the need for complex arrays and a cooling system.

A further object of the invention is to provide an improved type of infra-red radiation point detector.

Still another object of the invention is to provide a relay whereby infra-red radiation can control radiation from any source of any wavelength.

The invention has wide utility in detecting infra-red radiation and making same known by operation of other means or by display on a screen of an image corresponding to that of the infra-red source.

DESCRIPTION OF THE PRIOR ART

The Fabray-Perot interferometer, or etalon, the principle of which will be briefly described hereinafter with reference to the drawings, may be considered the point of departure of the present invention, although other devices quite dissimilar from the present apparatus have been used for the same purpose. For further background reference may be made to the content and bibliography of an article entitled "Automatic Control of the Spacing of Fabray-Perot Interferometers" appearing at page 1297 of the August issue of Applied Optics reproducing a paper delivered in April 1966 by J. V. Ramsey.

SUMMARY OF THE INVENTION

Briefly, the invention contemplates an etalon with a composite reflecting back plate made up of the polished reflecting ends of a plurality of parallel infra-red conductive fibres each secured at one end to an infra-red conducting infra-red image receiving base. Variations in the lengths of the fibres upon being heated by absorption of infra-red radiation will vary the spacing between the free ends of the fibres and the front plate of the etalon so that collimated light, preferably monochromatic, reflected from the etalon will produce an image when passed through a suitable lens means onto a screen or other display means.

BRIEF DESCRIPTION OF THE DRAWINGS

FIG. 4 is a schematic view of an infra-red image converter according to the invention; and FIG. 5 is a schematic view of a lens system useful with the invention.

DESCRIPTION OF PRIOR ART ETALON

Figure 1:
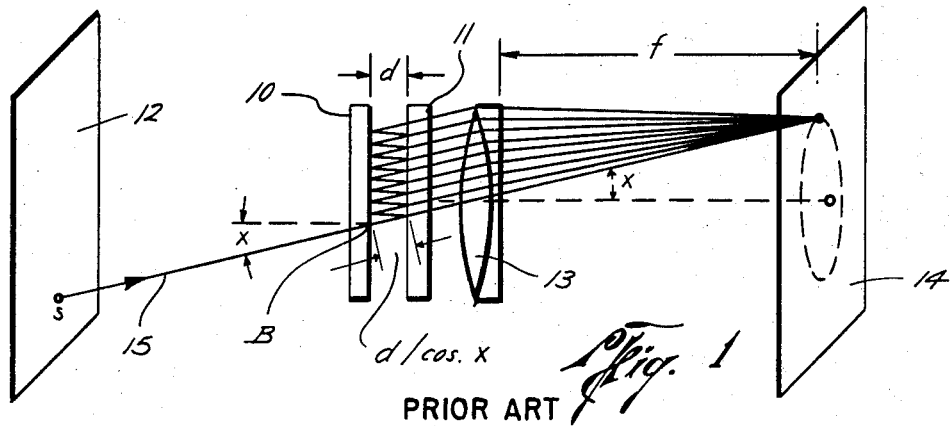
FIG. 1 is a schematic view of an etalon.

Referring now to FIG. 1, there is shown an etalon comprising front and back parallel semi-silvered glass plates 10 and 11. The glass forming the body of each plate provides support means for the radiation reflecting surface means formed by the silver. The plates are placed between an extended light source 12 and a lens means 13. Light from source 12 after passing through the etalon and lens is brought into focus on screen 14 in the focal plane of the lens means 13. A light ray 15 from a point S on the source 12 will pass through front plate 10 and be repeatedly partially transmitted and partially reflected by back plate 11 and reflected from front plate 10 producing a plurality of parallel rays which the lens means 13 will converge to a point P on screen 12. The path lengths of the multiple parallel rays produced from ray 15 differ from each other by $2d/\cos x$ where $d$ is the perpendicular distance between plates 10 and 11 and $x$ is the angle the ray 15 makes with its perpendicular projection on front plate 10. Assuming monochromatic light, if the path length difference $2d/\cos x$ is an integral multiple of the wavelength $w$ of the light, the ray components produced from ray 15 will be in phase when they reach 14 and produce a bright spot, but otherwise the ray components will interfere to a greater or lesser degree and the spot will be of less or zero brightness. Therefore the light from extended source 12 will produce on screen 14 a series of concentric bright rings whose radii will be proportional to the square roots of the integers counting from zero at the center where there will be a bright spot.

DESCRIPTION OF PREFERRED EMBODIMENTS OF INVENTION

Figure 2:
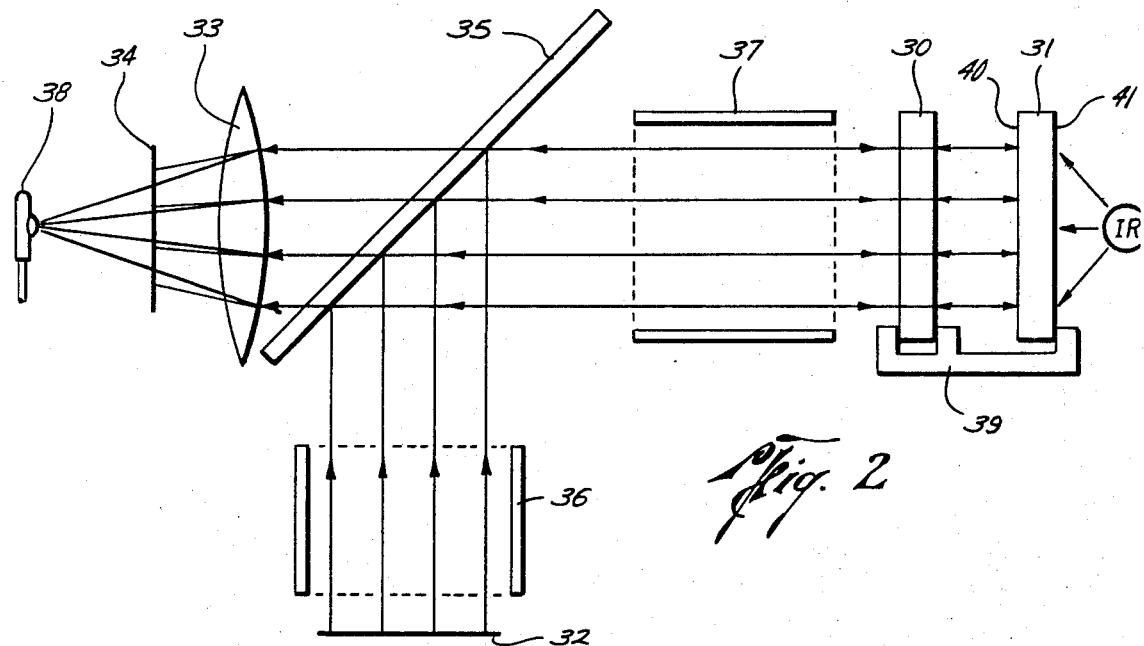
FIG. 2 is a schematic view of a point detector embodying the invention.

Referring now to FIG. 2, there is shown a point detector comprising a modified etalon. Parts analogous to those shown in FIG. 1 bear the same reference numbers except increased by 20. The FIG. 2 etalon comprises front plate 30 and back plate 31. In this case front plate 30 is semi-reflecting as in FIG. 1, but the reflecting means 40 at front surface of the back plate 31 is totally reflecting. The extended light source 32 is placed to one side of the etalon and its rays are reflected onto the etalon by semi-transparent mirror 35. The rays reflected from back plate 31, after one or more transmissions through or reflections from front plate 30, are sent back toward mirror 35 and pass therethrough into lens system 33 which focuses the rays on screen 34.

Collimator means 36, 37 are provided between source 32 and the etalon so that only parallel rays fall on the etalon. In other words, the angle $x$ equals zero throughout. Again, considering monochromatic light, if the plate spacing $d$ of the etalon is adjusted or "tuned" so that it is some integral or half-integral multiple of the wave length $w$ the components of each light ray from the source 15 reflected back from the etalon will all be in phase and the screen 34 will have a uniform maximum illumination. Since parallel light is used, screen 34 need not be placed in the focal plane of lens means 33. If desired, however, a suitable light sensitive means such as a photo tube 38 may be substituted for screen 34 and it will preferably be placed at or near the focus of lens means 33 concentrated in a small diameter spot. Such arrangement will be useful in the point detector shown in FIG. 2, the remainder of the components of which will now be described.

It is to be understood that the front and back plates of an etalon are rigidly mounted so that the spacing $d$ of the reflecting means at their adjacent surfaces is fixed subject to such adjustment as the user desires. Such a rigid mounting is indicated at 39 in FIG. 2. However mounting 39 is such as to leave the reflecting means 40 at the front face of the back plate free to move relative to the back face 41 thereof. The body of back plate 31 is made of an infra red transmitting and absorbing material having an appreciable thermal coefficient of expansion so that when the back face 41 is exposed to radiation from an infra red source IR, the back plate is heated and expands. The expansion moves front face 40 toward front plate 30, shortening the plate spacing $d$. If the expansion is such as to reduce $d$ by a quarter wavelength of light from source 32, and if the plate spacing was initially such as to produce maximum interference and minimum illumination at light sensitive means 38, the final result of the infrared radiation on plate 31 will be a bright spot of maximum illumination at 38; if the initial spacing was such as to produce maximum reinforcement, the expansion will result in interference and a decrease in illumination at 38.

The apparatus just described constitutes a point detector, all of the radiation to be detected that falls on the back of plate 31 being effective to produce an increase of light at the point corresponding to the focus of lens means 33 at which is located the eye of the photo tube or other light sensitive means. The point detector can be used to monitor any equipment subject to overheating under adverse conditions, such as electric conductors, fuse boxes, transistorized electronic circuits, brake drums, bearings, radiators, compressors, catalytic crackers, nuclear reactors and other equipment and components. The detector may also be used as a temperature responsive device and the light responsive means calibrated to read in conventional units such as degrees centigrade.

It is important to appreciate that the apparatus just described functions as a relay in that the radiation from one source, namely, the infrared source, controls the radiation from another source, the visible light source. The second source may be of any desired wavelength to which the etalon will respond, including all wavelengths from the short X-ray radiation through the visible spectrum to much longer wavelengths. It is only necessary that the radiation be capable of partial reflection and partial transmission in the etalon, with a parallel relationship of the plates precise enough to provide interference or reinforcement as the case may be. Since feeble infrared radiation can, through the relay, control a powerful visible or other type radiation source and control same proportional to the intensity of the infrared source, the apparatus also can function as an amplifier. By a modification, next to be described, the apparatus functions as an infrared image converter.

Figure 3:
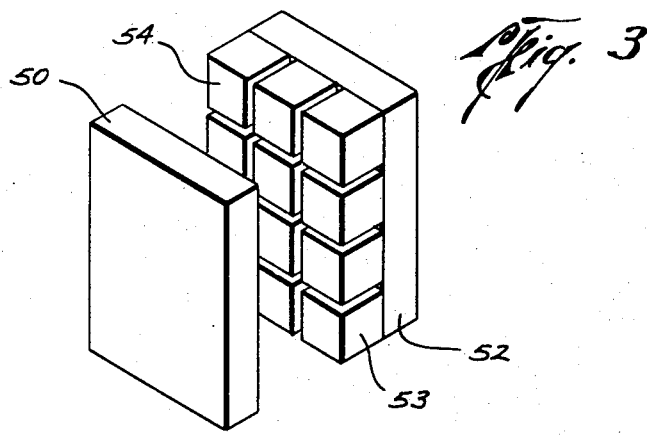
FIG. 3 is a schematic view of etalon plates illustrating a simplified mosaic back plate in accordance with the invention.

Referring now to FIG. 3 there is shown a further modification of the etalon plates including a semi-reflecting front plate 50 and a composite back plate. The back plate comprises a base 52 to which are secured a plurality of elements or blocks 53. The face of each block adjacent plate 50 is ground smooth providing a totally reflecting means or mirror surface 54. If the blocks are close together and their mirror surfaces 54 are coplanar, their effect will be substantially the same as that of the totally reflecting means 40 at the surface of plate 31 of the etalon shown in FIG. 2. If the plate spacing $d$ is an integral or half-integral multiple of the wavelength $w$ of the monochromatic radiation used to illuminate the composite etalon, then, if used in the arrangement of FIG. 2, employing the screen 34 rather than the radiation sensitive means 38, the screen 34 would be uniformly brightly illuminated except for relatively unnoticeable dark lines corresponding to the spaces between blocks 53. If the reflecting face 54 of any one of the blocks 53 is displaced from the plane of the faces of the rest of the blocks by a distance $x$ different from half a wavelength, light reflected from the displaced face will not be perfectly in phase with that reflected from other blocks, resulting in interference, and a corresponding area of lower illumination will appear on the screen. The darkness of the area will increase as $x$ increases from zero to a quarter wavelength and then diminish as $x$ increases to a half wavelength. If the reflecting face of more than one block is displaced, a pattern of dark areas will appear on the screen having the same configuration as the pattern of displaced blocks.

If the base 52 is made of infra-red radiation transmitting material and the blocks 53 are made of infra-red radiation transmitting and absorbing material having a substantial temperature coefficient of expansion, like the back plate 31 of the etalon shown in FIG. 2, then when infra-red radiation falls on base 52, it will heat blocks 53. If the infra-red radiation is not uniform, the blocks 53 will not be uniformly elongated and a pattern of areas of differing intensities of illumination will appear on screen 34. The pattern on screen 34 will correspond coarsely to the pattern of intensity of infra-red radiation falling on base 52. By increasing the number of elements or blocks 53 per unit area of base 52, the coarseness can be reduced to produce any desired degree of sharpness of correspondence of infra-red and visible light patterns. The apparatus then functions as an infra-red image converter.

Referring now to FIG. 4, there is shown in more detail an infra-red image converter of the same type as that just described but adapted to produce a sharper converted image. Parts which are the same as or similar to those shown in FIG. 2 are given the same reference number plus 100. There is an extended source of monochromatic light 132, collimating means 136, semi-reflecting mirror 135, collimating means 137, etalon plate unit 100, optical lens means 133, and screen 134. In addition there is an infra-red lens means 160 for producing an infra-red image 161 on the back of the etalon from infra-red source 162.

The unit 100 comprises a light transparent disc shaped front plate 150 having a semi-reflecting layer 163 on the back side thereof. The back plate of the plate unit includes a light transmitting and absorbing disc shaped base 152 carrying a plurality of elements or fibres 153 analogous to blocks 53 shown in FIG. 3 but of much smaller transverse dimension providing a much larger number per unit area of plate. The free end of each fibre is ground smooth to provide a fully reflecting means 154 at the end of the fibre. It is not essential that the diameter of each fibre be the same but it is preferable that their diameters be as nearly the same as is possible. The fibres may, for example, each have a diameter of the order of 10 to 20 microns. Since visible light has a wavelength of 0.39 to 0.78 micron, it will be apparent that the resolving power of the bundle of fibres is quite high.

Between reflecting layer 163 of the front plate and base 152 of the back plate are disposed temperature invariant spacer means in the form of ring 164 and variable spacer means in the form of washer 165. Washer 165 is made of piezo electric material. An adjustable electric potential is applied to washer 165 by potentiometer 166 supplied by battery 167 or other source of constant voltage electric power. Other means may be used to apply a variable potential to washer 165. By adjusting potentiometer 166 or in other manner varying the potential across the faces of washer 165, the thickness of the washer is adjusted, thereby varying the distance between the front and back plates of the etalon. In this manner the etalon can be adjusted so that absence of infra-red radiation in excess of ambient will cause the screen 134 to be bright and varying intensity of excess infra-red radiation falling on base 161 will produce corresponding variable reductions in intensity of illumination on screen 134. Alternatively, the etalon could be tuned to be dark in the absence of excess infra-red radiation and the screen would be illuminated responsive to the presence of abnormal infra-red radiators on the scene. For example infra-red source 162, corresponding to some object invisible due to lack of visible light thereon, will produce an infra-red image 161 on base 152 of the etalon, which will result in a visible image 170 on screen 134. If instead of using a source of monochromatic light 132, a source of white light is substituted, the scene at screen 134 will appear in color.

The fibres 153 of the back plate of the etalon should be self supporting so that because of lack of good contact therebetween, there will be little lateral transmission of radiant or sensible heat from one fibre to another. The fibres may be made of any of a variety of materials, e.g., arsenic selenide ($As_2 Se_3$), germanium, silver chloride, tellurium, selenium. An infra-red radiation absorption material may be introduced as an impurity into a primary material, in which case the primary material could be transparent to infra-red or it could also be capable of absorption of infra-red radiation.

In order that the fibres may be evenly heated by the infra-red radiation falling on them, the density of infra-red absorbing material therein should vary along the length thereof, being smaller at the fixed ends of the fibres where the intensity of the infra-red radiation is greatest and increasing toward the free ends where the intensity of the infra-red radiation is at a minimum. According to the law of Lambert or Bouger, as radiation traverses an absorbing medium, its intensity ($I_x$) after traveling a distance $x$ is given by $$(I_x) = (I_o)(e)^{-kx} \tag{1}$$

where $k$ is the absorption coefficient of the material. If the density of the absorption material is varied so that $$I_x = I_o x \tag{2}$$

corresponding to uniform absorption throughout the length of the fibre, then, combining (1) and (2) we find that $$I_o(e)^{-kx} = I_o x$$

or $$k = -\frac{1-ogx}{x} \tag{3}$$

For maximum sensitivity, the fibres should be long enough to absorb substantially all of the energy of the infra-red radiation falling thereon. In this regard infra-red radiation may be defined to be the electromagnetic radiation band extending from the visible spectrum (7800 A.) at one side toward the radio spectrum as far as 3,000,000 A. (300 m$\mu$) at the other. See p. 735 of Physics by F. L. Robeson published 1943 by The MacMillan Company.

The materials used in conventional fibre optics are poor conductors of infra-red radiation and, therefore, become heated when transmitting infra-red radiation. They are, therefore, well suited for use in the present invention. The manufacturing methods of fibre optics technology are, therefore, well adapted to the manufacture of the back plate of the etalon plate unit of the present invention.

The fibres 153 may be drawn from larger diameter rods by the methods used with glass for fibre optics. Prior to drawing, the rods are coated with a material, which may be called matrix material, that can later be removed, e.g. by melting, leaching, shrinking. The coated drawn fibres, disposed side by side in a bundle, are treated as a unit in the process of cutting and grinding and polishing and attachment at one end to base 152 of the back plate of the etalon. Then the matrix material, e.g. paraffin or polymer, is removed leaving the fibres free except where secured to base 152.

The engineering requirements for a converter suitable for a particular purpose may be determined from the following theory of the operation of the converter. Consider a converter having a time constant $c$, that is, one which is suitable to convert infra-red images faithfully if the infra-red scene does not change substantially in periods of the order of $c$ seconds. The change in length of each fibre upon absorption of infra-red radiation is $$\text{delta } L = (L)(a)\text{delta } T \tag{4}$$

where L is the length of the fibre, $a$ is the linear temperature coefficient of expansion of the fibre, and T is the temperature.

Neglecting heat losses, during the period $c$ of radiation the temperature rise is $$\text{delta } T = (H)(c)/Lps \tag{5}$$

where $p$ is the fibre density, $s$ is the specific heat of the fibre, and H is the irradiance at the sensing surface of the fibre (assumed to be completely absorbed by the fibre).

Combining (4) and (5) we have $$\text{delta } L = (a/ps)(cH) \tag{6}$$

It is to be noted that delta L is independent of L so that the fibres may be of any desired length consistent with mechanical requiremenets and the preferable full absorption of the infra-red radiation. Fibres having a length of one inch may be used.

The irradiance at the sensing surface is $$H = \sigma(e_1 T_1^4 - e_2 T_2^4) t / 4f^2 \tag{7}$$

where $T_1$ is the absolute temperature of the object being imaged, $e_1$ is its emissivity, $e_2$ and $T_2$ are the emissivity and absolute temperature of the surrounding in which the radiating object is located, $t$ is the transmission of the infra-red lens system of the converter, $f$ is the relative focal length of the infra-red lens system, i.e. the ratio of the focal length to pupil diameter, usually called the $f$ number, and $\sigma$ is the Stefan-Boltzman constant.

If the light source 132 has a wavelength $w$ cm. then, to produce a maximum contrast on the screen 170 between the image of the background and that of the infra-red subject $$\text{delta } L_{max} = w/4 \quad (8)$$

more generally, $$\text{delta } L = mw/4 \quad (9)$$

where $m$ is the modulation, $$m = \text{delta } L/\text{delta } L_{max} \quad (10)$$

Combining Equations 6, 7 and 9 we have $$m = (t/f^2) \cdot (a/ps) \cdot (1/w) \cdot (e_1 T_1^4 - e_2 T_2^4)(c\sigma) \quad (11)$$

in which the first factor is a function of the infra-red lens system, the second factor is an attribute of the fibre material, the third factor relates to the etalon self illumination, and the last group relates to the nature and speed of change of the infra-red scene. Since the nature and speed of change of the infra-red scene are beyond the control of the designer, the variation factors in achieving a suitable design are therefore the first three factors.

Consider an infra-red scene consistent with $c = 1$ sec.
$T_1 = 310$ (98.6 deg. F.)
$e_1 = 1.0$ (black body)
$T_2 = 300$ (80.6 deg. F.)
$e_2 = 0.35$ (ordinary terrain)

Then, since $$\sigma = 5.67(10^{-12}) \text{ watts/cm}.^2/\text{deg}.$$

the fourth group in Equation 11, which may be called the scene factor N, is $$N = (C\sigma)(e.T.^4 - C_2 T_2^4) = .36$$

The quantity $a/ps$ for several materials suitable for use as the fibres is set forth in the following table:

| Material: | $a/ps/10^5$ |
|---|---|
| NaCl | 1.62 |
| Ge | 0.37 |
| As$_2$Se$_3$ | 2.3 |
| Te | 1.3 |
| AgCl | 1.9 |
| Se | 2.5 |

The larger the value of $a/ps$, the less stringent will be the design requirements placed on the rest of the system. Therefore in the following it will be assumed that the fibres are made of one of the materials having a fairly large value of $a/ps$, assuming arsenic selenide to be the fibre material $$m = (t/f^2)(2.3)(1/w)(.036)(10^{-5})$$
$$m = (.084)(t/f^2)(1/w)(10^{-5}) \quad (12)$$

From Equation 12 it is apparent that by use of short wavelength light for the source 132, a more pronounced effect can be obtained. If a fluorescent screen 134 is provided, ultra violet light may be used for source 132. If the ultra violet light has a wave length of 1000 A., or $10^{-5}$ cm., then $$m = (.084)(t/f^2) \quad (13)$$

If the transmission of the infra-red optical system is .95, then $$m = .084/f^2 \quad (14)$$

From this it is apparent that for a substantial modulation $m$, $f^2$ must be as small as possible. By means of conventional immersion optics, an $f$ number of 0.3 is easily attainable. Then $$m = .084/.09 = 93\%$$

which is nearly maximum.

It is also to be observed that by increased the time constant, heretofore assumed to be 1 second, a further increase in sensitivity can be obtained.

Referring now to FIG. 5, a suitable immersion optics lens systems for use with the invention comprises a concentric lens 200, a correction lens 201 disposed concentrically within aperture stop 202, silicon element 203, primary mirror surface 204 and secondary mirror surface 205. A cylindrical recess 206 in element 203 receives the etalon plate unit 100 previously described in connection with FIG. 4. The construction shown reduces a 30 degree field to 8.5 degrees, upon entering the silicon medium, resulting in an effective optical speed of $f/0.29$.

If such a large angle of view without excessive distortion is not required, or if full modulation is not essential, or if even shorter wavelength light is used to illuminate the plates, immersion optics may be eliminated and it is to be understood that the invention is not limited to the use of immersion optics. For example a corrected reflector or multiple element refractor might be used.

While preferred embodiments of the invention have been shown and described, many modifications thereof can be made by one skilled in the art without departing from the spirit of the invention, and it is intended that the scope of the invention be limited only by the claims which follow:

I claim:
1. Image converter including:
   a front plate and a back plate,
   temperature invariant positioning means disposing said plates in parallel spaced apart relationship,
   the front plate being made of light transmitting material and having a semi-reflecting mirror surface,
   a source of parallel light and beamsplitting means for directing said light upon the front of the front plate,
   view screen means receiving light from the front of the front plate,
   the back plate including support means and radiation reflecting means on the face of the support means nearest the front plate,
   said support means including a solid base and a plurality of solid elements each having a portion fixed to the base and a free end,
   the free end of each element being provided with reflecting means, said reflecting means at the free ends of said elements being movable independently of each other and together forming said radiation reflecting means,
   said solid elements being made of infra-red radiation transmitting and absorbing material having a temperature coefficient of expansion different from zero,
   said solid base being made of infra-red radiation transmitting material, and
   infra-red radiation lens means positioned on the opposite side of said base from said elements to form an infra-red image on said base.

2. Invention according to claim 1 wherein said radiation reflecting means is substantially totally reflecting.

3. Invention according to claim 1 wherein said elements of the support means include material selected from the group comprising germanium, arsenic selenide, tellurium, silver chloride, selenium, and sodium chloride.

4. Invention according to claim 1 wherein the view screen means is made of fluorescent material and said source of light supplies light in the ultra violet range.

5. Invention according to claim 1 wherein each element has the shape of a fibre of substantially uniform diameter from one end to the other, the diameters of the fibres being all of the same order of magnitude.

6. Invention according to claim 5 wherein the fibre diameters are of the order of 10 to 20 microns.

7. Invention according to claim 1 in which each element includes infra-red radiation transmitting material in which is diffused infra-red radiation absorbing material.

8. Invention according to claim 1 wherein light from said source is monochromatic.

9. Invention according to claim 8 including piezoelectric means between the front plate and the base portion of the back plate and a source of adjustable electric potential connected to said piezoelectric means to vary the spacing between said front plate and said base according to the adjustment of said potential.

10. Invention according to claim 1 wherein said beam-splitting means comprises a semi reflecting mirror means disposed to receive radiation from said source and reflect it onto said front plate and to transmit said radiation reflected from said back plate onto said view screen.

References Cited

UNITED STATES PATENTS

| | | | |
|---|---|---|---|
| 2,456,801 | 12/1948 | Tolson | 250—83 |
| 3,050,725 | 8/1962 | Kuecken | 350—163X |
| 3,297,388 | 1/1967 | Woodcock et al. | 350—1 |
| 3,323,886 | 6/1967 | Hays | 350—96 |
| 3,387,531 | 6/1968 | Hesse | 350—163 |

OTHER REFERENCES

Malyshew, G. M., and Ryskin, A. I., "On the Possibility of Using Fiber Optics in an Arrangement Consisting of a Fabray-Perot Interferometer and an Electron-Optical Converter," from Optics and Spectroscopy, vol. XVII, No. 5, November 1964, p. 433.

Peters, C. G., "The Use of the Interferometer in the Measurement of . . .," from Journal of the Washington Academy of Sciences, vol. 9, No. 10, May 19, 1919, pp. 281–284.

RONALD L. WIBERT, Primary Examiner

T. MAJOR, Assistant Examiner

U.S. Cl. X.R.

250—83; 350—163; 356—106, 112